Figure 1:
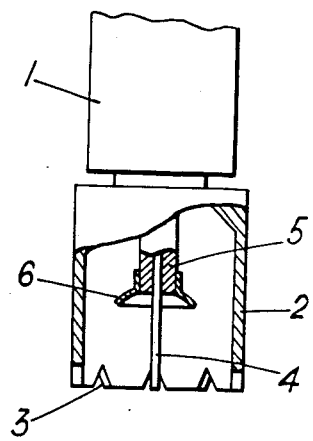

May 16, 1961                L. J. BRITTAINE ET AL            2,984,734
                              ELECTRIC ARC WELDING
                              Filed Nov. 2, 1959

Inventor
LAURENCE JOSEPH BRITTAINE
GEOFFREY EDWARD FORTIN
By
Aaron R. Townshend  Attorney

United States Patent Office 2,984,734
Patented May 16, 1961

2,984,734

ELECTRIC ARC WELDING

Lawrence Joseph Brittaine, Morden, Surrey, and Geoffrey Edward Fortin, Dorset, London, England, assignors to The British Oxygen Company Limited, a company of Great Britain Filed Nov. 2, 1959, Ser. No. 850,472

Claims priority, application Great Britain Nov. 13, 1958

5 Claims. (Cl. 219—127)

This invention relates to processes for electric arc welding using a consumable electrode.

The consumable electrode gas shielded arc welding process is successfully used for the seam welding of aluminium and its alloys but difficulty has been found in spot or tack welding such materials by this process. In all electric spot welding processes it is necessary to limit the duration of the flow of welding current by suitable timing means. In the case of electric arc spot welding the timing cycle is conveniently initiated when the consumable electrode, which is fed towards the workpiece to strike the welding arc, contacts the surface of the workpiece. This arrangement gives good results when the workpiece is of ferrous material but has not been found reliable when applied to aluminium alloys. For good spot welds reliable and instantaneous arc initiation is essential since the spot weld timing cycle is relatively short, of the order of 0.5 to 1.0 second, say, depending upon the thickness of the workpiece. Any hesitancy of arc initiation or irregularity of the welding arc results in a variation of the period during which heat is supplied from the welding arc, with consequent variation of weld penetration.

One method of improving arc initiation when welding aluminium and aluminium alloys forms the subject of Hardy et al. Patent 2,965,745, issued Dec. 20, 1960. This method requires the presence between the workpiece surface and the electrode tip of aluminium in powdered or other fragmentary form. It is an object of the present invention to provide an alternative method of achieving consistent initiation of the welding arc more reliably than hitherto.

According to the present invention, we provide a process of electric arc welding in which weld metal is deposited from a consumable electrode of readily oxidised metal such as aluminium or magnesium or their alloys; in which the welding arc is initiated by feeding the electrode forward to contact the workpiece and passing an electric current therethrough; and in which the welding arc and deposited weld metal are shrouded during welding by a gas which minimises oxidation of the weld metal; characterised in that appreciable oxidation of the electrode tip is caused to take place at the end of the welding period and whilst the metal of the electrode tip is so hot that further cooling produces a ridged surface on the electrode tip.

Preferably the appreciable oxidation of the electrode tip is caused to take place before the metal of the electrode tip has solidified.

This appreciable oxidation may be obtained by prolonging the period during which the metal of the electrode tip is molten. This may be achieved by focusing on the electrode tip heat radiated from the deposited weld metal. This may be done for example by means of a reflector mounted at the outlet end of the contact tube through which welding current is fed to the electrode.

An alternative method of causing appreciable oxidation of the electrode tip is to introduce a larger proportion of an oxidising gas into the gas shrouding the electrode tip at the end of the welding period. Care must be taken, when using this method, not to allow the oxidising gas to deleteriously affect the weld nugget.

Figure 2:
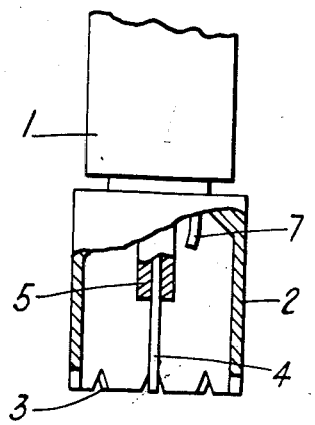

The invention may be applied to an inert gas shielded electric arc process for spot welding overlapped sheets of aluminium or aluminium alloys, and will now be described as applied to this process with reference to Figure 1 and Figure 2 of the accompanying drawings. In these figures the same parts are denoted by the same reference numerals. Figure 1 is a side elevation, partly in section, of a welding torch suitable for carrying out the invention, and Figure 2 is a similar side elevation, partly in section, of an alternative embodiment of the invention.

A spot welding gun has a barrel 1 terminating in a nozzle 2, which may be in the form of a cup. This nozzle 2 is held against one of the sheets of aluminium (not shown) which are to be spot welded. The space within the nozzle is purged of deleterious gases by supplying inert gas such as argon, and this gas vents to the atmosphere through the notches 3 in the lower rim of the nozzle 2. A consumable electrode 4 is then fed through a current contact tube 5 towards the workpiece by electrically driven feed rolls of conventional type (not shown in the drawings). When the electrode contacts the surface of the workpiece, an electrical circuit completed through the electrode and workpiece sets a timing relay in action. The instant the electrode contacts, this relay is arranged to interrupt firstly the electrode feed and, after a turn back period, the flow of welding current after a predetermined time sufficient to allow the production of a good weld but insufficient to allow the welding arc to burn through the workpieces being welded. In an alternative form of the process the welding current may be interrupted by allowing the welding arc to burn back the electrode, when the electrode feed is interrupted, until the arc voltage is insufficient to maintain an arc. In these known processes the electrode is fed towards the workpiece at speeds of, say, two or three hundred inches per minute. In some cases the electrode feed speed is arranged to be increased when the electrode contacts the workpiece. The preferred power source has a constant potential or slightly rising volt-ampere characteristic and a rapid response.

Any delay in initiating the welding arc will have an appreciable effect on the weld produced since the welding cycle is of the order of only 1 second depending on the thickness of the workpiece being welded.

In such a process we have found by experiment that spot welds can be made with reliable and instantaneous arc initiation provided that after each weld the electrode tip is left in a suitable condition for the next weld. This suitable condition is achieved when the electrode tip has projecting points or ridges which form regions of local high current intensity when the electrode makes contact with the workpiece. We have found that this condition on the electrode tip can be achieved if the conditions are adjusted so that appreciable oxidation of the electrode tip is caused whilst the metal of the electrode tip is still molten. Due to the very high melting point of the aluminum oxide, it forms a solid skin over the still liquid metal. As the liquid metal cools, solidifies and cools still further after solidification, the aluminum oxide skin collapses irregularly, producing a ridged surface.

In order to achieve this effect the cooling conditions must be correctly adjusted, a suitable balance being struck between the rate of cooling and the rate of oxidation. The rate of cooling of the electrode tip is controlled to a considerable extent by the rate of flow of the gas which shrouds the electrode, and the rate of oxidation is normally governed to a large extent by the oxygen content of this shrouding gas.

The oxygen content of the standard high-purity argon which is used as a shielding gas for welding is normally very small. Consequently, in order that an appreciable skin of oxide is formed on the electrode tip before the metal solidifies, it is necessary to prolong the period during which this metal is molten. This may be achieved according to the invention by mounting a small heat reflector 6, of conical form and of metal for example, at the outlet end of the contact tube 5 which is disposed within the gas directing nozzle 2 and which conducts welding current to the electrode as this electrode is fed towards the workpiece (not shown). This reflector 6 is arranged to focus heat radiated from the weld pool onto the point spaced from the contact tube 5 and occupied by the tip of the electrode 4 when the electrode has burnt back and the arc is extinguished. The additional heat supplied by this reflector allows the electrode tip to oxidise while it is still molten, thereby forming a skin of oxide, which, on solidification of the molten metal gives the ridged structure of the tip which permits reliable arc initiation when the electrode is next fed to the workpiece.

In one experiment using a conical heat reflector as referred to in the preceding paragraph, two overlapped sheets of 1/8 inch thick commercially pure aluminium were repeatedly spot welded together satisfactorily using 1/16 inch diameter commercially pure aluminium wire. Argon was supplied at 20 cubic feet per hour to purge the nozzle of deleterious gases and shield the welding arc. Welding current was supplied from a constant potential power source providing an open circuit voltage of 27 volts. The electrode wire was fed towards the workpiece at 13 inches per minute to initiate the arc, this speed being increased to 240 inches per minute when the welding arc was formed. The control circuit was adjusted so that the welding time occupied 0.7 second, and the wire feed was stopped 0.13 second before the welding current was interrupted.

In an alternative embodiment of the invention, the applicable oxidation of the electrode tip may be obtained by increasing the rate of oxidation by introducing a larger proportion of oxygen into the gas shrouding the electrode tip. Thus air or oxygen, or other oxidising gases such as carbon dioxide, may be introduced into the gas shrouding the electrode tip at or towards the end of the welding period. As shown in Figure 2, this gas may be introduced into the nozzle via a supply pipe 7 directed towards the electrode tip. It may be necessary to inject only a small amount of an oxidising gas into this gas shroud. It may be preferable to inject the oxidising gas down the contact tube or through an annulus provided by a tube co-axially positioned over the contact tube.

The invention may also be applied to the spot welding of magnesium, magnesium alloys, or any other readily-oxidised metal.

We claim:

1. A process for producing electric arc spot welds in workpieces of readily oxidised metal selected from the group consisting of aluminium, magnesium and alloys of these metals, which comprises feeding a consumable electrode wire of the readily oxidised metal to the workpiece, establishing an electric arc between the electrode wire and the workpiece, supplying a shielding gas around the electrode wire to shroud the welding arc from the atmosphere, this gas shroud containing a small proportion of oxygen, allowing the electrode wire to burn back at the end of the welding period, and then focussing on to the tip of the electrode wire heat radiated from the weld pool whereby the period for which the tip of the electrode wire is molten is prolonged and a ridged oxide surface is formed on the tip.

2. A process in accordance with claim 1, characterised in that the shielding gas is argon.

3. In apparatus for producing a series of electric arc spot welds on a workpiece of easily oxidised metal and comprising means for feeding a consumable electrode wire of the easily oxidised metal to a welding arc formed between the electrode wire and the workpiece to form a weld pool on the workpiece, a contact tube through which the electrode wire is arranged to pass adapted to supply welding current to the electrode wire, a nozzle surrounding the outlet end of the contact tube and adapted to direct around the welding arc a shielding gas flowing around the contact tube, the improvement which consists in the provision of a heat reflector within the nozzle adapted to focus heat radiated from the weld pool at a point spaced from the outlet end of the contact tube, this point being occupied by the tip of the electrode wire when the electrode wire has burnt back during extinguishing of the welding arc at the end of each weld.

4. In apparatus for producing a series of electric arc spot welds on a workpiece of easily oxidised metal and comprising means for feeding a consumable electrode wire of the easily oxidised metal to a welding arc formed between the electrode wire and the workpiece to form a weld pool on the workpiece, a contact tube through which the electrode wire is arranged to pass adapted to supply welding current to the electrode wire, a nozzle surrounding the outlet end of the contact tube and adapted to direct around the welding arc a shielding gas flowing around the contact tube, the improvement which consists in a heat reflector mounted on the contact tube to allow flow of shielding gas there around through the nozzle and adapted to focus heat radiated from the weld pool at a point spaced from the outlet end of the contact tube, this point being occupied by the tip of the electrode wire when the electrode wire has burnt back during extinguishing of the welding arc at the end of each weld.

5. Electric arc welding apparatus as claimed in claim 4, characterised in that the heat reflector is of conical shape and is of metal.

References Cited in the file of this patent

UNITED STATES PATENTS 2,845,524 Morley _____ July 29, 1958